(12) United States Patent
Alexander et al.

(10) Patent No.: US 7,296,760 B2
(45) Date of Patent: Nov. 20, 2007

(54) INDEXING VALVE

(75) Inventors: Kevin L. Alexander, Brownsburg, IN (US); Michael C. Rodgers, Montpelier, OH (US)

(73) Assignee: Illinois Tool Works Inc., Glenview, IL (US)

( * ) Notice: Subject to any disclaimer, the term of this patent is extended or adjusted under 35 U.S.C. 154(b) by 385 days.

(21) Appl. No.: 10/990,824

(22) Filed: Nov. 17, 2004

(65) Prior Publication Data
US 2006/0108451 A1 May 25, 2006

(51) Int. Cl.
*B05B 1/28* (2006.01)
(52) U.S. Cl. .......... 239/301; 239/71; 239/73; 239/296; 239/300; 239/414; 239/416.5; 239/417.5; 239/690; 239/707
(58) Field of Classification Search .......... 239/71, 239/73, 74, 290, 296, 297, 300, 301, 423, 239/424, 433, 413, 414, 415, 416.5, 417.3, 239/417.5, 690, 704, 705–707
See application file for complete search history.

(56) References Cited
U.S. PATENT DOCUMENTS

| | | | |
|---|---|---|---|
| 2,864,649 A * | 12/1958 | Adams | ......... 239/300 |
| 3,168,250 A | 2/1965 | Paasche | |
| 3,940,061 A | 2/1976 | Gimple et al. | |
| 3,964,683 A | 6/1976 | Gimple | |
| 3,990,609 A | 11/1976 | Grant | |
| 4,001,935 A | 1/1977 | Krohn et al. | |
| 4,002,777 A | 1/1977 | Juvinall et al. | |
| 4,030,857 A | 6/1977 | Smith, Jr. | |
| 4,037,561 A | 7/1977 | LaFave et al. | |
| 4,081,904 A | 4/1978 | Krohn et al. | |
| 4,105,164 A | 8/1978 | Lau et al. | |
| 4,114,564 A | 9/1978 | Probst | |
| 4,116,364 A | 9/1978 | Culbertson et al. | |
| 4,133,483 A | 1/1979 | Henderson | |
| D252,097 S | 6/1979 | Probst et al. | |
| 4,165,022 A | 8/1979 | Bentley et al. | |
| 4,169,545 A | 10/1979 | Decker | |
| 4,174,070 A | 11/1979 | Lau et al. | |
| 4,174,071 A | 11/1979 | Lau et al. | |
| 4,214,709 A | 7/1980 | Scull et al. | |
| 4,248,386 A | 2/1981 | Morle | |
| 4,331,298 A | 5/1982 | Bentley et al. | |
| RE30,968 E | 6/1982 | Grant | |
| 4,361,283 A | 11/1982 | Hetherington et al. | |
| D270,179 S | 8/1983 | Grime | |

(Continued)

FOREIGN PATENT DOCUMENTS

DE  42 26 770 A1  5/1994

(Continued)

*Primary Examiner*—Steven J. Ganey
(74) *Attorney, Agent, or Firm*—Barnes & Thornburg LLP (57) ABSTRACT

A valve for controlling the flow of a gas or mixture of gases through a passageway in a coating material dispensing device includes first and second valve portions. The first valve portion is adjustable with respect to the second valve portion selectively to adjust the flow through the passageway. One of the first and second valve portions includes a first engagement member and the other of the first and second valve portions includes a second engagement member. Engagement of the first and second engagement members indicates the relative orientation of the first and second valve portions.

14 Claims, 8 Drawing Sheets

U.S. PATENT DOCUMENTS

| | | |
|---|---|---|
| D270,180 S | 8/1983 | Grime |
| D270,367 S | 8/1983 | Grime |
| D270,368 S | 8/1983 | Grime |
| 4,401,268 A | 8/1983 | Pomponi, Jr. |
| 4,433,812 A | 2/1984 | Grime |
| 4,437,614 A | 3/1984 | Gascowski |
| 4,453,670 A | 6/1984 | Sirovy |
| 4,483,483 A | 11/1984 | Grime |
| 4,513,913 A | 4/1985 | Smith |
| 4,529,131 A | 7/1985 | Rutz |
| 4,537,357 A | 8/1985 | Culbertson et al. |
| 4,544,100 A * | 10/1985 | Simashkevich et al. ..... 239/415 |
| 4,606,501 A | 8/1986 | Bate et al. |
| 4,613,082 A | 9/1986 | Gimple et al. |
| D287,266 S | 12/1986 | Knetl et al. |
| 4,747,546 A | 5/1988 | Talacko |
| 4,759,502 A | 7/1988 | Pomponi, Jr. et al. |
| 4,760,962 A | 8/1988 | Wheeler |
| 4,770,117 A | 9/1988 | Hetherington et al. |
| 4,844,342 A | 7/1989 | Foley |
| D303,139 S | 8/1989 | Morgan |
| D305,057 S | 12/1989 | Morgan |
| D305,452 S | 1/1990 | Morgan |
| D305,453 S | 1/1990 | Morgan |
| 4,911,367 A | 3/1990 | Lasley |
| 4,927,079 A | 5/1990 | Smith |
| 4,934,603 A | 6/1990 | Lasley |
| 4,934,607 A | 6/1990 | Lasley |
| 4,993,642 A * | 2/1991 | Hufgard ..................... 239/300 |
| 4,993,645 A | 2/1991 | Buschor |
| 5,022,590 A | 6/1991 | Buschor |
| D318,712 S | 7/1991 | Buschor |
| 5,054,687 A | 10/1991 | Burns et al. |
| 5,064,119 A | 11/1991 | Mellette |
| 5,074,466 A | 12/1991 | Santiago |
| 5,090,623 A | 2/1992 | Burns et al. |
| 5,118,080 A | 6/1992 | Hartmann |
| 5,119,992 A | 6/1992 | Grime |
| 5,141,161 A * | 8/1992 | Anderson et al. ........... 239/300 |
| 5,178,330 A | 1/1993 | Rodgers |
| 5,180,104 A | 1/1993 | Mellette |
| 5,209,365 A | 5/1993 | Wood |
| 5,209,405 A | 5/1993 | Robinson et al. |
| 5,236,129 A | 8/1993 | Grime et al. |
| 5,277,367 A * | 1/1994 | Hsu ........................... 239/73 |
| 5,284,299 A | 2/1994 | Medlock |
| 5,284,301 A | 2/1994 | Kieffer |
| 5,289,974 A | 3/1994 | Grime et al. |
| 5,299,740 A | 4/1994 | Bert |
| 5,303,865 A | 4/1994 | Bert |
| 5,330,108 A | 7/1994 | Grime et al. |
| 5,332,156 A | 7/1994 | Wheeler |
| 5,332,159 A | 7/1994 | Grime et al. |
| D349,559 S | 8/1994 | Vanderhoef et al. |
| 5,351,887 A | 10/1994 | Heterington et al. |
| 5,395,054 A | 3/1995 | Wheeler |
| 5,400,971 A | 3/1995 | Maugans et al. |
| 5,553,788 A | 9/1996 | Del Gaone et al. |
| 5,582,350 A | 12/1996 | Kosmyna et al. |
| 5,618,001 A | 4/1997 | Del Gaone et al. |
| 5,639,027 A | 6/1997 | Fritz |
| RE35,769 E | 4/1998 | Grime et al. |
| 5,803,313 A | 9/1998 | Flatt et al. |
| 5,829,679 A | 11/1998 | Strong |
| 5,836,517 A | 11/1998 | Burns et al. |
| RE36,378 E | 11/1999 | Mellette |
| 6,179,223 B1 | 1/2001 | Sherman et al. |
| 6,189,809 B1 | 2/2001 | Schwebemeyer |
| 6,276,616 B1 | 8/2001 | Jenkins |
| 6,402,058 B2 | 6/2002 | Kaneko et al. |
| 6,460,787 B1 | 10/2002 | Hartle et al. |
| 6,572,029 B1 | 6/2003 | Holt |
| 6,669,112 B2 | 12/2003 | Reetz, III et al. |
| 6,698,670 B1 | 3/2004 | Gosis et al. |
| 6,712,292 B1 | 3/2004 | Gosis et al. |
| 2003/0006322 A1 | 1/2003 | Hartle et al. |

FOREIGN PATENT DOCUMENTS

| | | |
|---|---|---|
| GB | 521 899 A | 6/1940 |
| GB | 1 482 052 | 8/1977 |

* cited by examiner

INDEXING VALVE

FIELD OF THE INVENTION

This invention relates to controls for coating dispensing devices (hereinafter sometimes spray guns). It is disclosed in the context of a valve for controlling the flow of shaping air to the air cap of a spray gun. However, it is believed to be useful in other applications as well.

BACKGROUND OF THE INVENTION

Various types of manual and automatic spray guns are known. There are, for example, the manual spray guns illustrated and described in the following listed U.S. patents and published applications: 2003/0006322; U.S. Pat. Nos. 6,712,292; 6,698,670; 6,669,112; 6,572,029; 6,460,787; 6,402,058; U.S. Pat. No. RE36,378; 6,276,616; 6,189,809; 6,179,223; 5,836,517; 5,829,679; 5,803,313; U.S. Pat. No. RE35,769; 5,639,027; 5,618,001; 5,582,350; 5,553,788; 5,400,971; 5,395,054; D349,559; 5,351,887; 5,332,159; 5,332,156; 5,330,108; 5,303,865; 5,299,740; 5,289,974; 5,284,301; 5,284,299; 5,236,129; 5,209,405; 5,209,365; 5,178,330; 5,119,992; 5,118,080; 5,180,104; D325,241; 5,090,623; 5,074,466; 5,064,119; 5,054,687; D318,712; 5,022,590; 4,993,645; 4,934,607; 4,934,603; 4,927,079; 4,911,367; D305,453; D305,452; D305,057; D303,139; 4,844,342; 4,770,117; 4,760,962; 4,759,502; 4,747,546; 4,702,420; 4,613,082; 4,606,501; D287,266; 4,537,357; 4,529,131; 4,513,913; 4,483,483; 4,453,670; 4,437,614; 4,433,812; 4,401,268; 4,361,283; D270,368; D270,367; D270,180; D270,179; U.S. Pat. No. RE30,968; 4,331,298; 4,248,386; 4,214,709; 4,174,071; 4,174,070; 4,169,545; 4,165,022; D252,097; 4,133,483; 4,116,364; 4,114,564; 4,105,164; 4,081,904; 4,037,561; 4,030,857; 4,002,777; 4,001,935; 3,990,609; 3,964,683; and, 3,940,061.

The disclosures of these references are hereby incorporated herein by reference. The above listing is not intended to be a representation that a complete search of all relevant art has been made, or that no more pertinent art than that listed exists, or that the listed art is material to patentability. Nor should any such representation be inferred.

Figure 8:
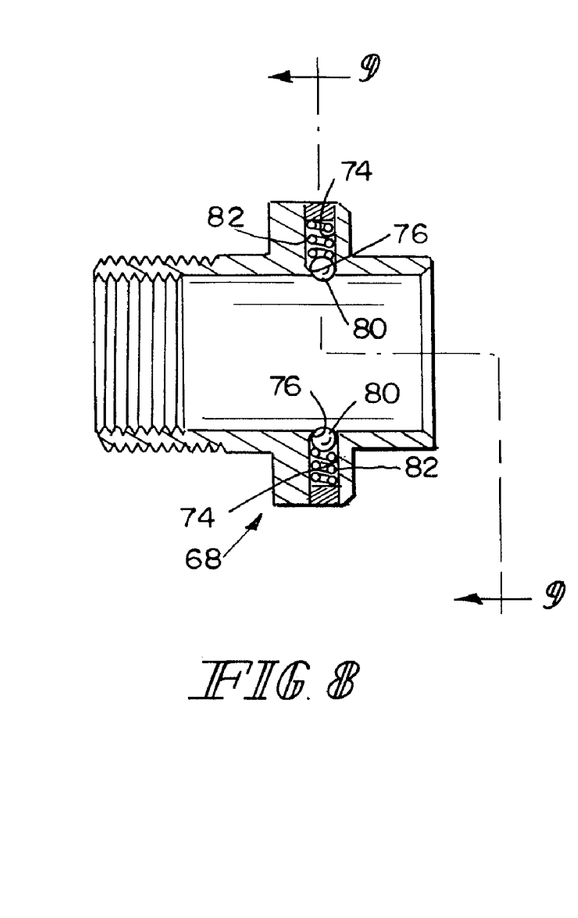
Figure 9:
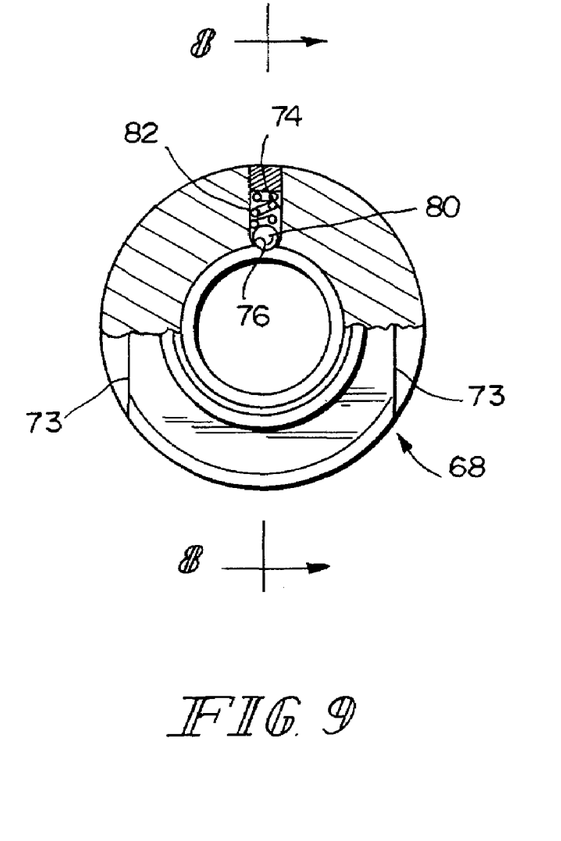
Figure 10:
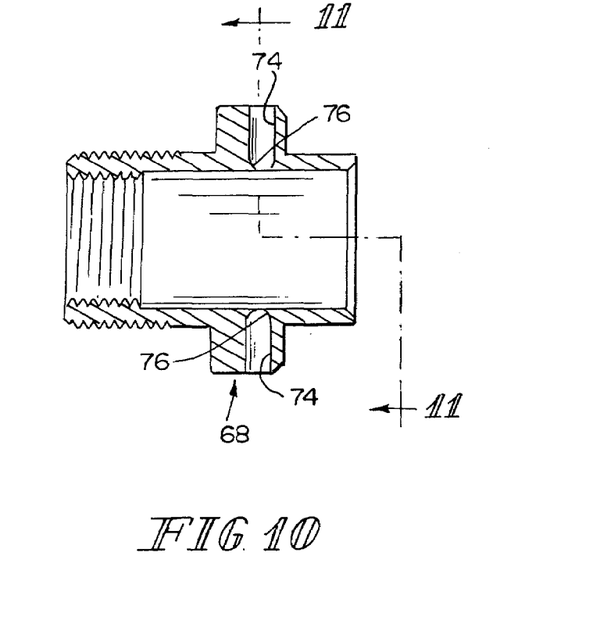
Figure 11:
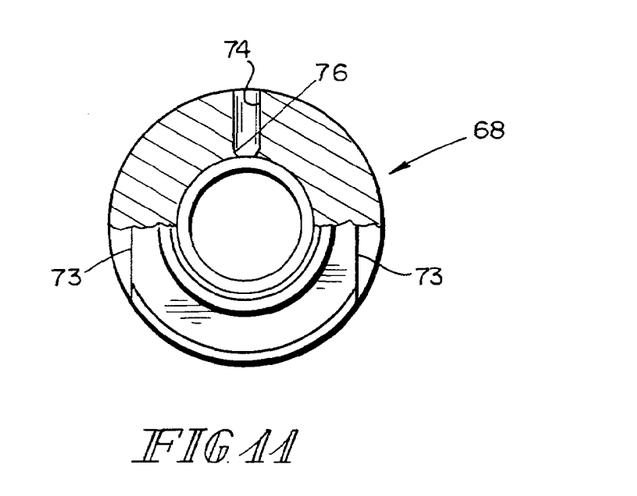

Spray guns of various types include an orifice, or nozzle, through which a stream of coating material is dispensed, and one or more orifices adjacent the nozzle through which (a) stream(s) of gas or mixture of gases, typically compressed air, is (are) supplied at (a) selected pressure(s) and flow rate(s) to aid in atomization of the stream of coating material, and shaping of the resulting cloud of atomized coating material particles. While currently available spray guns typically include valves for adjusting the flow rate(s) of such gas stream(s), such valves typically to not provide feedback on the flow rate(s) of the gas stream(s) to the operator in any way other than by observing the shape of the pattern formed by the atomized coating material particles on an article being coated. It would be useful in simplifying the replication of a desired pattern to be able to duplicate flow rates of the stream(s) of gas or mixture of gases from job to job.

DISCLOSURE OF THE INVENTION

According to the invention, a valve for controlling the flow of a gas or mixture of gases through a passageway in a coating material dispensing device includes first and second valve portions. The first valve portion is adjustable with respect to the second valve portion selectively to adjust the flow through the passageway. One of the first and second valve portions includes a first engagement member and the other of the first and second valve portions includes a second engagement member. Engagement of the first and second engagement members indicates the relative orientation of the first and second valve portions.

Illustratively, the valve is incorporated into a coating material dispensing device including a first orifice through which coating material is dispensed and a second orifice adjacent the first orifice through which a gas or mixture of gases is provided. The passageway couples the gas or mixture of gases from a source of the gas or mixture of gases to the second orifice.

Illustratively, the second orifice comprises an orifice through which the gas or mixture of gases is directed onto the cloud of dispensed coating material particles to aid in shaping the cloud.

Illustratively, the first valve portion comprises a valve stem and the second valve portion comprises a valve body. The valve stem includes first threads and the valve body includes second threads. The first and second threads engage to permit adjustment of the valve stem with respect to the valve body.

Illustratively, the stem includes a control knob at its outer end. The control knob is configured to assist in gripping control knob to adjust the valve.

Illustratively, the first and second engagement members comprise a notch and a ball yieldably urged into the notch.

Illustratively, the notch is provided on the valve stem and the ball is provided on the valve body.

Illustratively, the valve stem includes a generally part spherically shaped tip. The passageway includes a generally circular cross section portion. The generally part spherically shaped tip and generally circular cross section portion have substantially the same radius of curvature. The valve stem includes an axis about which it is turned to adjust the relative orientation of the first and second valve portions. The generally circular cross section portion has a center. The axis intersects the center.

BRIEF DESCRIPTION OF THE DRAWINGS

The invention may best be understood by referring to the following detailed description and accompanying drawings which illustrate the invention. In the drawings:

FIGS. 1*a-b* illustrate fragmentary sectional side elevational views, not to the same scale, of a spray gun incorporating a valve constructed according to the invention;

FIG. 2 illustrates an end elevational view of a detail of the spray gun illustrated in FIGS. 1*a-b;*

FIG. 3 illustrates a sectional view of the detail illustrated in FIG. 2, taken generally along section lines 3-3 of FIG. 2;

FIG. 4 illustrates an end elevational view of a component of the detail illustrated in FIGS. 2-3;

FIG. 5 illustrates a sectional view of the component illustrated in FIG. 4, taken generally along section lines 5-5 of FIG. 4;

FIG. 6 illustrates a sectional view of the component illustrated in FIGS. 4-5, taken generally along section lines 6-6 of FIG. 5;

FIG. 7 illustrates an end elevational view of a subassembly of the detail illustrated in FIGS. 2-3;

FIG. 8 illustrates a sectional view of the subassembly illustrated in FIG. 7, taken generally along section lines 8-8 of FIG. 7;

FIG. 9 illustrates a partial sectional view of the subassembly illustrated in FIGS. 7-8, taken generally along section lines 9-9 of FIG. 8;

FIG. 10 illustrates a component of the subassembly illustrated in FIG. 8; and, FIG. 11 illustrates a partial sectional view of the component illustrated in FIG. 10, taken generally along section lines 11-11 of FIG. 10.

DETAILED DESCRIPTIONS OF ILLUSTRATIVE EMBODIMENTS

Figure 1A:
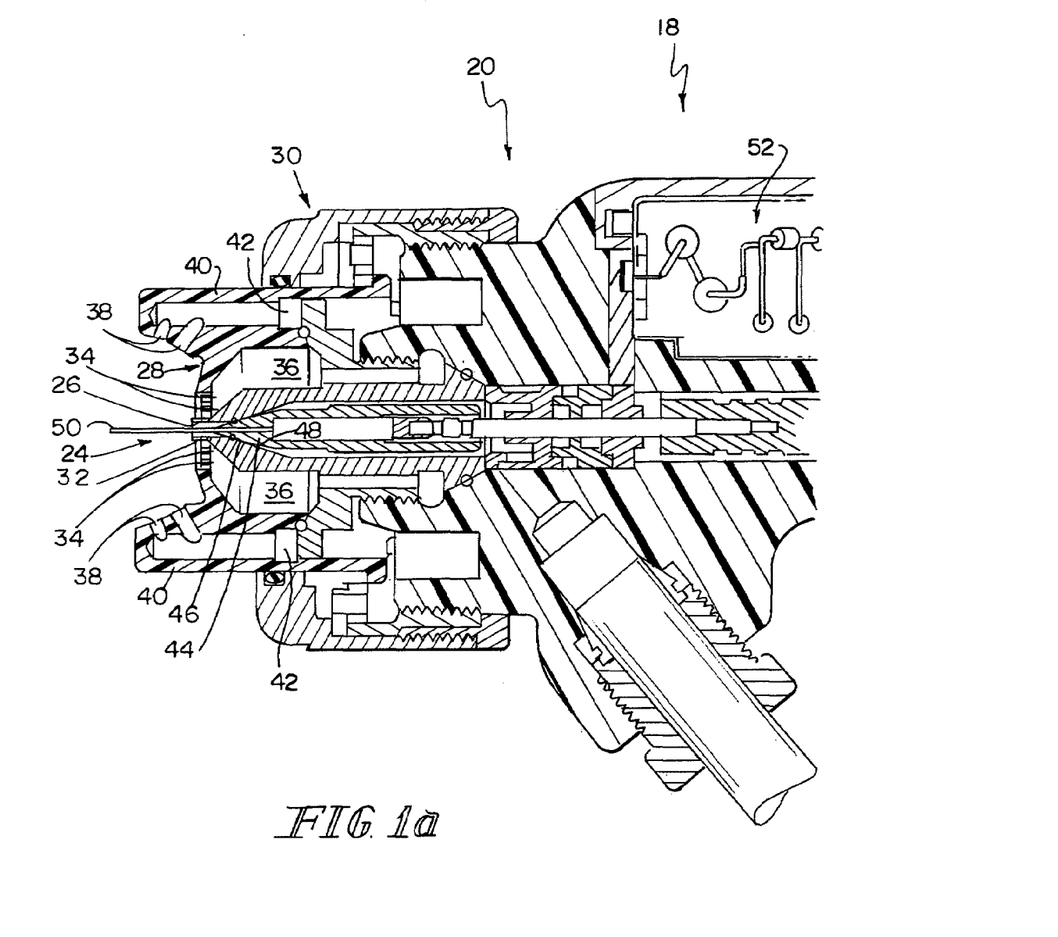
Figure 1B:
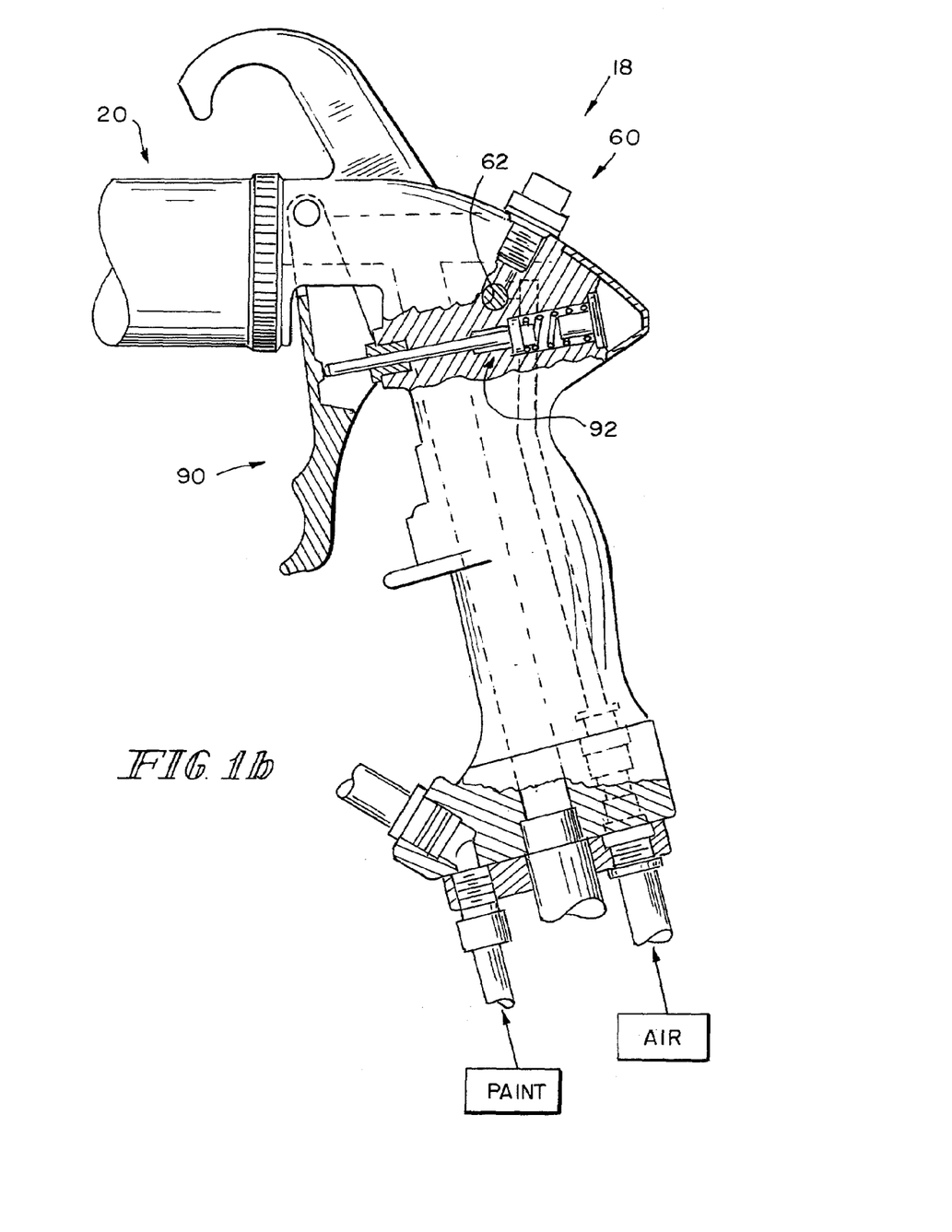
Figure 2:
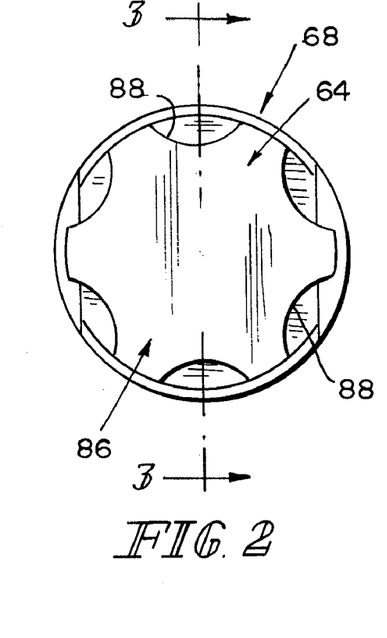
Figure 3:
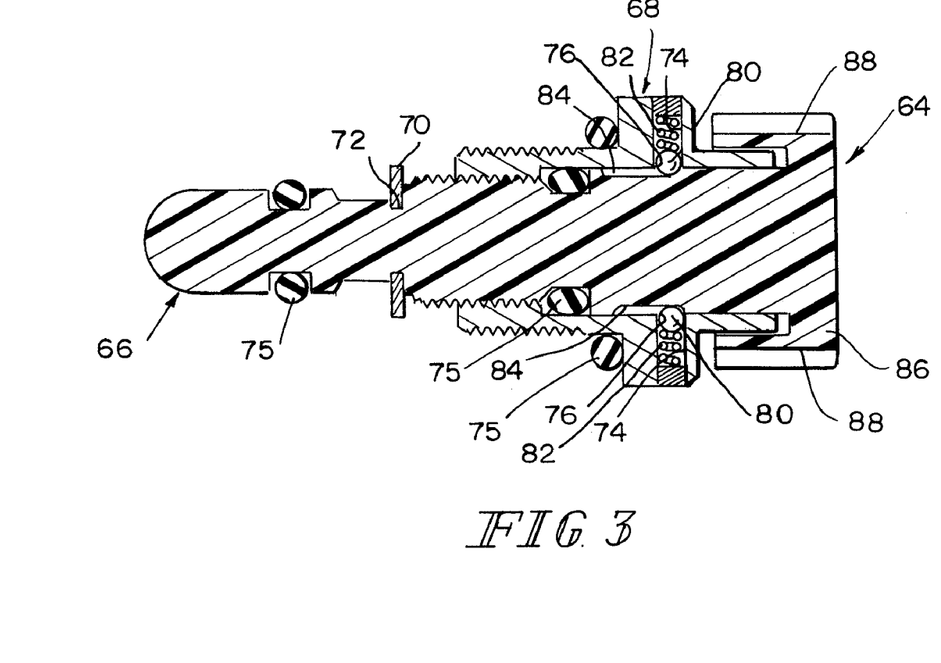
Figure 4:
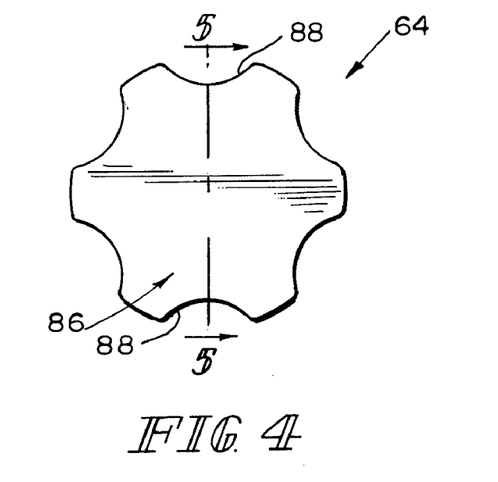
Figure 5:
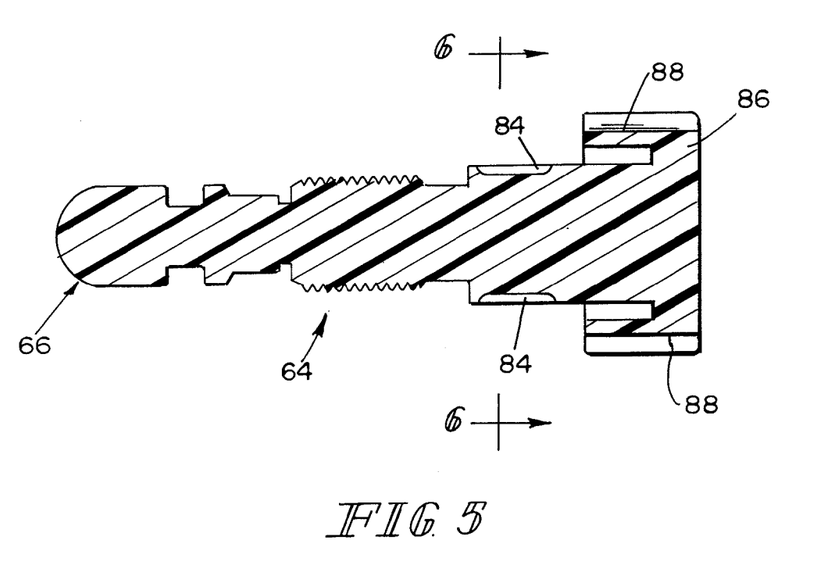
Figure 6:
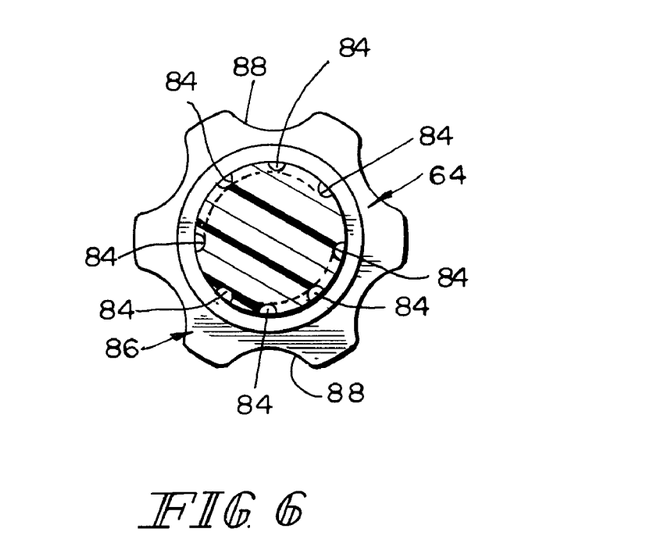
Figure 7:
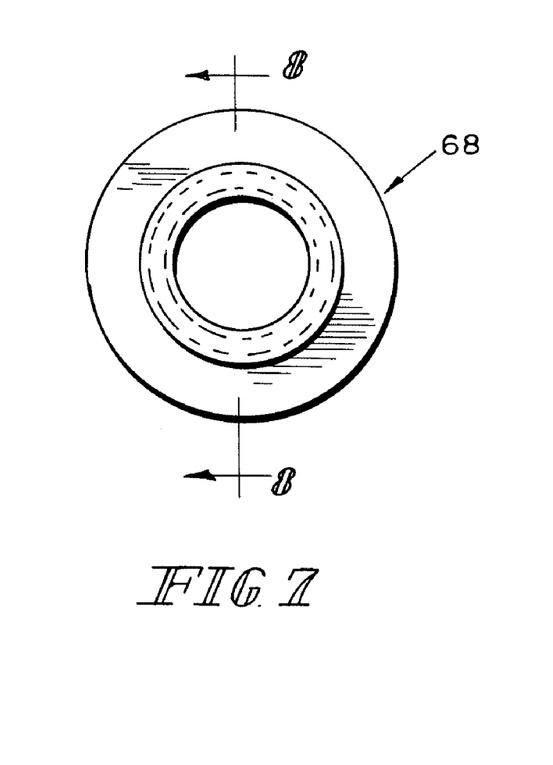

Referring now to FIGS. 1a-b, a spray gun 18 includes a spray gun body 20 housing a nozzle 24. Nozzle 24 is disposed at the front end of the gun body 20 to dispense fluent coating material (hereinafter sometimes paint) from a front end opening 26. An air cap 28 is attached to the front end of the gun body 20 by a retaining ring 30. The air cap 28 has a central atomizing air orifice 32 and a plurality of atomizing air orifices 34 surrounding the central orifice 32. These orifices communicate with a gallery 36 which is coupled to a supply of compressed air. Shaping air orifices 38 are provided on air horns 40 which extend forward from diametrically opposite sides of the air cap 28. The shaping air orifices 38 communicate with a shaping air supply gallery 42 which is also coupled to a supply of compressed air. Shaping air orifices 38 provide air for shaping a spray pattern of paint flowing from the nozzle 24 and atomized by air from atomizing air orifices 32, 34.

The spray gun 18 includes a valve including a valve body 44 having a somewhat frustoconically shaped front end 46 which cooperates with a complementarily configured valve seat 48 formed by an inner wall of a front portion of the nozzle 24. A needle-like electrode 50 projects forward from valve body 44 and is coupled via its rearward extension through valve body 44 to a terminal of a high-magnitude potential supply 52 by which the particles of coating material become electrically charged as they leave the vicinity of nozzle 24. Spray gun body 20, nozzle 24, air cap 28, and valve body 44 illustratively are constructed from, for example, suitably chemically inert, electrically non-conductive resins or polymers, such as Delrin® or Acetron® brand acetal resin or polyetheretherketone. Electrode 50 illustratively is constructed from metal.

A shaping air control valve 60 is oriented rearwardly from the shaping air supply gallery 42 in a passageway 62 through which shaping air is supplied to gallery 42. Valve 60 includes a stem 64 having a generally part-spherically shaped tip 66. Stem 64 is threaded into a valve stem retaining nut or valve body 68 and captured in valve body 68 by an e-ring 70 which is snapped into a groove 72 provided therefor on stem 64. Valve body 68 is also threaded on its outside surface so that the assembled shaping air control valve 60 can be threaded into a passageway provided in spray gun 18 for this purpose, and includes diametrically opposed flats 73 to assist in threading control valve 60 into spray gun 18. Appropriate O-ring seals 75 are provided between valve stem 64 and valve body 68 to seal the these two against leakage, and between valve 60 and spray gun body 20 to seal the valve 60 into the body 20.

The part-spherical shape of the tip 66 has a radius equal to the radius of the region of the passageway 62 into which the tip 66 protrudes as the valve stem 64 is adjusted axially of the valve stem 64 axis into the passageway 62. The axis about which stem 64 is turned as it is threaded into and out of valve body 68 includes the center of the circular cross section region of passageway 62 in the vicinity of tip 66. This geometry permits the valve 60 to substantially completely shut off the flow of shaping air through passageway 62 to orifices 38 when tip 66 is projected completely into passageway 62.

Valve body 68 is provided with one or more, illustratively two, diametrically opposed, radially extending bores 74. Each bore 74 provides a seat 76 at its radially inner end adjacent stem 64. Seats 76 provide positive stops for an equal number, illustratively two, of detent balls 80. Each ball is spring 82-urged against its seat 76. Valve stem 64 includes a number, illustratively eight, of peripherally equally angularly spaced axially extending grooves or notches 84 into which spring 82-urged balls 80 snap when stem 64 is turned so that one of the grooves or notches 84 is under each ball 80. Stem 64 further includes a control knob 86 at its outer end. Control knob 86 is scalloped 88, knurled or otherwise textured to assist the operator in gripping control knob 86, for example, between a thumb and index finger, to adjust valve 60.

The operator receives the sensation of the detent balls 80 snapping into their respective grooves or notches 84 by feeling and/or hearing the balls 80 snap into their respective grooves or notches 84. The operator may thus count the number of "clicks" from the orientation of the valve 60 in which no fan air is being provided to some number of clicks corresponding to the desired fan shape or pattern of the cloud of atomized coating material particles. Once this number of clicks has been sensed, the operator stops turning knob 86, and a coating operation can commence.

The source of compressed gas or mixture of gases is provided to a passageway controlled by a trigger 90-operated valve 92 forward in spray gun 18 to gallery 36 and either through valve 92 or independently to passageway 62. Either way, passageway 62 is controlled by separate valve 60. Valve 60 is controlled by the position of knob 86. Valve 60 controls the flow of shaping air to shaping air orifices 38 on horns 40 of air cap 28. The outside diameter of the valve stem 64 is provided with notches, grooves, or the like, 84. The valve body 68 includes (a) spring 82-loaded ball(s) or the like, 80, which is (are) yieldably urged into a notch, groove, or the like, 84 beneath the ball(s) 80. There is thus provided an indexing fan air adjustment valve 60 that provides an indication to the operator of the adjustment of the valve 60. The operator can use the indication to adjust the valve 60 to provide the desired fan air flow rate. The operator establishes a desired flow rate once, and adjusts the valve 60 closed, counting the number of clicks until the valve 60 closes. The operator is then able to duplicate this adjustment by opening the valve 60 the same number of clicks in the same or any subsequent coating operation in which it is desired to provide the same spray pattern for the dispensed coating.

Illustratively, stem 64 is constructed from suitably chemically inert, electrically non-conductive resin or polymer, such as Torlon® 4203 polyamide-imide. Illustratively, valve stem retaining nut or valve body 68 and the spring 82 retaining plugs are constructed from aluminum or suitably chemically inert, electrically non-insulative resins or polymers, such as 30% carbon fiber filled Torlon® 7130 polyamide-imide. Detent balls 80 and springs 82 are illustratively stainless steel.

What is claimed is:

1. A valve for controlling the flow of a gas or mixture of gases through a passageway in a coating material dispensing device, the valve including a valve stem and a valve body, the valve stem adjustable with respect to the valve body selectively to adjust the flow through the passageway, one of the valve stem and valve body including a notch and the other of the valve stem and valve body including a ball yieldably urged by a spring into the notch, engagement of the ball and notch indicating the relative orientation of the valve stem and valve body, the valve stem including first threads and the valve body including second threads, the first and second threads engaging to permit adjustment of the valve stem with respect to the valve body.

2. The valve of claim 1 wherein the notch is provided on the valve stem and the ball is provided on the valve body.

3. The valve of claim 1 wherein the first valve portion comprises a valve stem including a generally part spherically shaped tip, the passageway including a generally circular cross section portion, the generally part spherically shaped tip and generally circular cross section portion having substantially the same radius of curvature, the valve stem including an axis about which it is turned to adjust the relative orientation of the first and second valve portions, the generally circular cross section portion having a center, and the axis intersecting the center.

4. A valve for controlling the flow of a gas or mixture of gases through a passageway in a coating material dispensing device, the valve including first and second valve portions, the first valve portion adjustable with respect to the second valve portion selectively to adjust the flow through the passageway, one of the first and second valve portions including a notch and the other of the first and second valve portions including a ball yieldably urged by a spring into the notch, engagement of the ball and notch indicating the relative orientation of the first and second valve portions.

5. The valve of claim 4 wherein the notch is provided on the first valve portion and the ball is provided on the second valve portion.

6. The valve of claim 4 wherein the first valve portion comprises a valve stem including a generally part spherically shaped tip, the passageway including a generally circular cross section portion, the generally part spherically shaped tip and generally circular cross section portion having substantially the same radius of curvature, the valve stem including an axis about which it is turned to adjust the relative orientation of the first and second valve portions, the generally circular cross section portion having a center, and the axis intersecting the center.

7. A coating material dispensing device including a first orifice through which coating material is dispensed, a second orifice adjacent the first orifice through which a gas or mixture of gases is provided, a passageway for coupling the gas or mixture of gases from a source of the gas or mixture of gases to the second orifice, and a valve for controlling the flow of gas or mixture of gases through the passageway, the valve including first and second valve portions, the first and second valve portions being relatively adjustable selectively to adjust the flow through the passageway, one of the first and second valve portions including a notch and the other of the first and second valve portions including a ball yieldably urged by a spring into the notch, engagement of the ball and notch indicating the relative orientation of the first and second valve portions.

8. The coating material dispensing device of claim 7 wherein the second orifice comprises an orifice through which the gas or mixture of gases is directed onto a cloud of dispensed coating material particles to aid in shaping the cloud.

9. The coating material dispensing device of claim 7 wherein the passageway includes a generally circular cross section portion, the first valve portion including a valve stem including a generally part spherically shaped tip, the generally part spherically shaped tip and generally circular cross section portion having substantially the same radius of curvature, the valve stem including an axis about which it is turned to adjust the relative orientation of the first and second valve portions, the generally circular cross section portion having a center, and the axis intersecting the center.

10. The coating material dispensing device of claim 9 wherein the first valve portion comprises a valve stem and the second valve portion comprises a valve body, the valve stem including first threads and the valve body including second threads, the first and second threads engaging to permit adjustment of the valve stem with respect to the valve body.

11. The coating material dispensing device of claim 10 wherein the stem includes a control knob at its outer end, the control knob configured to assist in gripping control knob to adjust the valve.

12. The coating material dispensing device of claim 7 wherein the first valve portion comprises a valve stem and the second valve portion comprises a valve body, the valve stem including first threads and the valve body including second threads, the first and second threads engaging to permit adjustment of the valve stem with respect to the valve body.

13. The coating material dispensing device of claim 12 wherein the notch is provided on the valve stem and the ball is provided on the valve body.

14. The coating material dispensing device of claim 12 wherein the stem includes a control knob at its outer end, the control knob configured to assist in gripping control knob to adjust the valve.

* * * * *